United States Patent [19]

Huling et al.

[11] 3,795,132

[45] Mar. 5, 1974

[54] CURVED SURFACE FINISH ANALYZER

[75] Inventors: Paul T. Huling, Plainfield; John J. Janes, Jr., Joliet, both of Ill.

[73] Assignee: Caterpillar Tractor Co., Peoria, Ill.

[22] Filed: May 30, 1972

[21] Appl. No.: 257,654

[52] U.S. Cl. .................................. 73/105
[51] Int. Cl. ............................... G01b 5/28
[58] Field of Search .......................... 73/105

[56] References Cited
UNITED STATES PATENTS

| | | | |
|---|---|---|---|
| 3,319,463 | 5/1967 | Salmanov et al. | 73/105 |
| 3,320,799 | 5/1967 | Goodey | 73/105 |
| 3,112,642 | 12/1963 | Harmon et al. | 73/105 |
| 3,087,329 | 4/1963 | Von Grodek et al. | 73/105 |
| 2,703,007 | 3/1955 | Brems | 73/105 |

*Primary Examiner*—Donald O. Woodiel
*Assistant Examiner*—Arthur E. Korkesz
*Attorney, Agent, or Firm*—Fryer, Tjensvold, Phillips & Lempio

[57] ABSTRACT

An analyzer for measuring the finish of an arcuate surface of manufactured objects, test specimens, or the like includes a movable carrier for supporting a stylus which is moved along the curved surface to sense surface irregularities. A guide portion of the carrier, adjacent the stylus, has a curvature conforming with that of the arcuate surface to be tested and rides thereon to position and guide the stylus along the arcuate surface during movement of the carrier relative thereto. This avoids a need for complex mechanism heretofore used to guide the stylus along a curved predetermined reference path.

6 Claims, 4 Drawing Figures

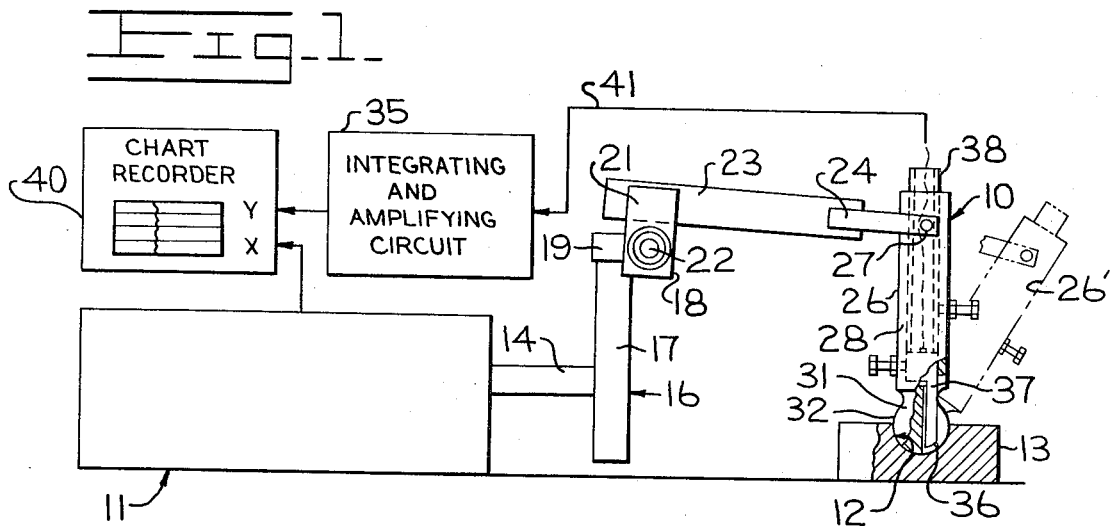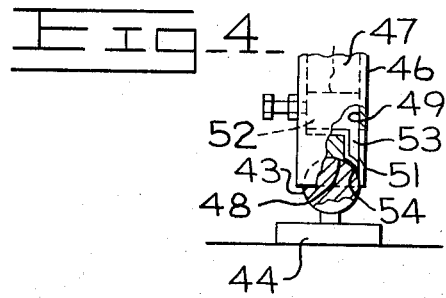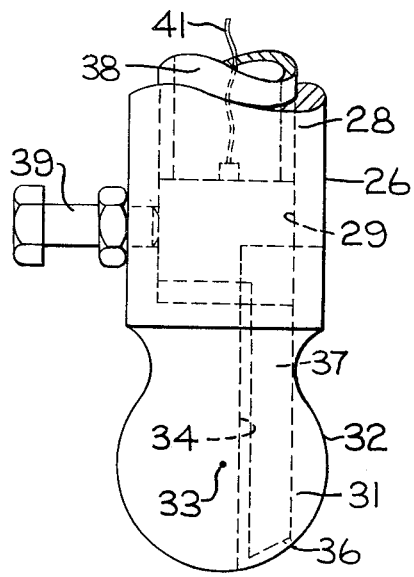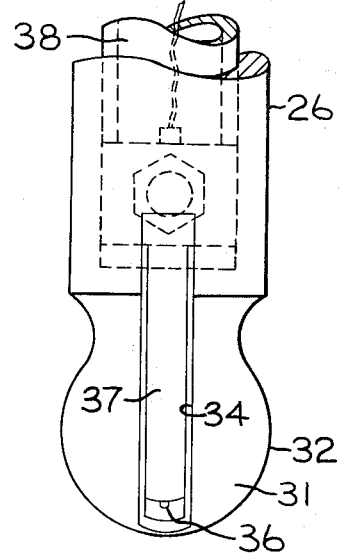

CURVED SURFACE FINISH ANALYZER

BACKGROUND OF THE INVENTION

Many manufactured machine components or the like require a specified degree of smoothness of surface finish to function properly and profilometers are commonly used to accurately measure the smoothness of such components to assure that the surface finish meets the specified standards. The most common type of profilometers are used primarily to check a flat or linear surface. Such profilometers usually have a feeler or stylus adapted for traversal of the flat surface and require very little preparation or set-up time. However, to check the surface finish of an arcuate surface has heretofore required additional complex and expensive equipment to guide the stylus of the profilometer in a path conforming to the desired arc of the surface to be checked. In these systems, the workpiece to be checked has to be positioned in accurate relation to this fixed predetermined path of the stylus and this has normally required tedious and time-consuming preparation.

SUMMARY AND OBJECTS OF THE INVENTION

This invention dispenses with the complex support and guidance mechanisms heretofore used to move a profilometer stylus carrier along a fixed predetermined reference arc by using a broad area of the test surface itself to define the reference arc. More specifically, the stylus is mounted in a carrier which, in the region adjacent the stylus, has a curvature corresponding to that of the surface to be tested and which is contacted therewith. Upon pivoting of the carrier relative to the test surface, about the center of curvature thereof, any small irregularities in the test surface cause the stylus to move relative to the carrier. Such stylus movement produces an electrical signal which can be amplified and recorded or displayed or otherwise utilized.

Accordingly, it is an object of the present invention to provide a simplified reliable and easily operated surface finish analyzer for measuring the finish of an arcuate surface.

Another object of this invention is to provide such an improved surface finish analyzer which is capable of quickly measuring the finish of an arcuate surface without the use of costly reference arc-generating equipment.

Another object of this invention is to provide an improved surface finish analyzer which utilizes the tested surface itself to slidably support and position the analyzer relative thereto such that a stylus of the analyzer precisely follows the contour of the arcuate surface during rotary motion of the analyzer.

Other objects and advantages of the present invention will be apparent upon reference to the accompanying drawings and following description.

BRIEF DESCRIPTION OF THE DRAWINGS

In the accompanying drawings:

FIG. 1 is a side-elevational view of a surface finish analyzer embodying the present invention portions of the analyzer being broken away, the analyzer being shown in engagement with a spherical cavity of a typical specimen to be tested, FIG. 2 is a side-elevation view of a portion of the surface finish analyzer, FIG. 3 is a front elevation view of the portion of the surface finish analyzer shown in FIG. 2, and FIG. 4 is a side elevation view of a portion of an alternate embodiment of the surface finish analyzer shown in engagement with a spherical ball test specimen.

DESCRIPTION OF PREFERRED EMBODIMENTS

Referring initially to FIG. 1 of the drawings, a surface finish analyzer 10 in accordance with the present invention may be attached to a traversing mechanism 11 of conventional construction. In this example, the surface finish analyzer 10 is employed to measure the finish of a semi-spherical cavity 12 formed in a flat rectangular workpiece 13.

Traversing mechanisms 11 of this known form have a shaft 14 extending horizontally from one end thereof which may be caused to undergo a linear reciprocating motion, such devices being customarily used to move a stylus across a flat surface to detect irregularities. To adapt traversing mechanism 11 to the present invention, an attachment head 16 is secured to the shaft 14 and includes a vertical post 17 supporting a pivot joint 18 at the upper end. The pivot joint 18 has a pair of elements 19 and 21 pivotally interconnected by a pivot axle 22 with the element 19 being secured to the upper end of the vertical post. A link 23 has one end secured to element 21 while distal end carries a fork 24.

Referring now to FIGS. 1, 2 and 3 in conjunction, the surface finish analyzer 10 of the present invention includes tubular stylus carrier 26 which has an upper end received in fork 24 and pivotally secured thereto by pivot means 27. The carrier 26 has a hollow body 28 which has a bore 29 extending axially therein and has a spherical guide portion 31 at the lower end, the bore 29 being terminated above the spherical portion. The spherical surface 32 provided on the guide portion 31, having a center of curvature 23, conforms with the cavity 12 of work piece 13. A slot 34 formed in the guide portion 31 is substantially parallel to the longitudinal axis of the carrier 26 but is spaced therefrom and communicates with the lower end of bore 29.

The spherical guide portion 31 of the carrier may thus be received within the semi-spherical cavity 12 of the work-piece 13. Under this condition, the arcuate guide surface 32 is substantially concentric with the cavity 12 such that the center of curvature 33 of both surfaces are substantially coincident.

Irregularities of the surface finish of cavity 12 are sensed by a feeler or stylus 36 which extends a short distance from the lower end of an arm 37 of a probe 38. Probes 38 of this form are also known devices heretofore used in profilometers and the like and accordingly will not be herein described in detail, suitable internal construction being well known to the art. By means of coils movable in the field of a magnet, piezoelectric crystals or other equivalent means, such probes produce an electrical signal in response to small longitudinal movements of the stylus 36 relative to arm 37 which signals may be integrated and amplified by suitable circuit means 35 and caused to drive the pen of a chart recorder 40 to produce a graphical trace of stylus movement relative to the arm 37. The output signal of probe 38 may also be utilized in other known ways. A signal in excess of a predetermined magnitude, for example, may be detected by suitable means and used to indicate a defective part.

Probe 38 is disposed within the bore 29 of the carrier 28 with arm 37 extending into the slot 34. A pair of lock screws 39 are threadably secured to the body to lock the probe 38 in a predetermined position at which stylus 36, in the absence of pressure thereon, extends a small distance outward from carrier surface 32. The output signal conductors 41 of probe 38 extend up through bore 29 to connect with circuit means 35.

In operation, with the shaft 14 and the attachment head 16 of the traversing mechanism 11 in the retracted position shown in FIG. 1, the surface finish analyzer 10 is manually positioned to locate the lower part of the spherical guide portion 31 of carrier 26 within the cavity 12 of the workpiece 13 with the carrier being upright. In such a position, the analyzer 10 is supported by the work-piece and the stylus 36 is in contact with the arcuate surface of the cavity 12. The traversing mechanism 11 is then activated to extend shaft 14 causing link 23 to swing the top of the carrier 26 in an arc to the position shown by dashed lines 26'. During such movement, guide portion 31 slidably rotates within the cavity 12 while stylus 36 precisely follows the contour of the cavity surface. Any surface irregularities in the cavity cause the stylus to move relative to arm 37 and thereby generate the desired signal.

Although the surface finish analyzer described above is adapted for measuring the finish of a hemi-spherical cavity, it will be apparent that the finish of a semicylindrical surface may be checked with only minor structural changes in the body of the carrier. Specifically, carrier surface 32 may be reshaped to have a cylindrical contour similar to that of the test specimen.

FIG. 4 shows a second surface finish analyzer in accordance with the present invention which is adapted to measure the finish of a spherical portion 43 of a workpiece 44. The apparatus may be similar to the embodiment previously described except for modifications at the lower end of the carrier 46. In the modified form, carrier 46 has a hollow body 47 which has a downwardly opening hemi-spherical cavity 48 formed on the lower end thereof. The cavity 48 conforms with the spherical portion 43 of workpiece 44 and may be emplaced thereon. A bore 49 extends axially within the body 47 and a slot 51 is provided at the lower end of the body, in spaced relation from the axis thereof and opens into the cavity and the bore. A probe 52 essentially similar to that previously described is disposed within the bore and has an arm 53, shorter than that of the previous embodiment which extends into the slot to support a movable stylus 54 positioned to contact and ride on spherical portion 43 of the workpiece.

The embodiment of FIG. 4 is operated in essentially the same manner as the first embodiment except that the carrier 46 is initially manually positioned to receive the spherical portion 43 of the workpiece in cavity 48. Thereafter, traversing mechanism 11 of FIG. 1 is operated and the carrier slidably turns about the spherical portion 43 while the stylus follows the surface contour thereof to produce a signal indicative of irregularities.

The embodiment of FIG. 4 may be modified in various ways such as by replacing the semi-spherical cavity 48 of the carrier with a conical or frustum shaped cavity or a configuration which contacts the spherical ball portion at a plurality of spaced contact points. The embodiment of FIG. 4 may also be adapted for measuring the surface finish of a cylinder by replacing the hemi-spherical cavity with a hemi-cylindrical cavity or an inverted V-shaped configuration.

Thus, the present invention provides an improved surface finish analyzer with which the finish of an arcuate surface can be quickly measured without complex and costly equipment for sweeping a stylus along the arcuate path. Essentially this is accomplished by mounting a stylus within a carrier having a guide surface precisely conforming to the desired surface configuration of the test specimen such that the stylus precisely follows the contour of the arcuate surface during pivotal movement of the analyzer while using the guide surface and the test surface itself to establish the reference arc.

While the invention has been described with particular reference to preferred embodiments, it will be apparent that many variations are possible that would fall within the scope of the invention which is not intended to be limited except as defined in the following claims.

What is claimed is:

1. A surface finish analyzer for detecting irregularities in an arcuate surface of an object comprising:
    a carrier having a guide portion which may be juxtaposed against said arcuate surface of said object while said carrier is pivoted relative thereto about the center of curvature thereof, said carrier having an opening in said guide portion thereof, said guide portion being situated at one end of said carrier and having a non-planar guide surface fittable against said arcuate surface of said object to support said one end of said carrier and to constrain said one end of said carrier against movement other than said pivoting movement about said center of curvature,
    a movable stylus supported in said carrier and extending through said opening of said guide portion for riding against said object surface to follow said irregularities therein as said carrier is pivoted,
    means for supporting the other end of said carrier and for shifting said other end of said carrier to produce said pivoting movement thereof, and
    means for detecting movement of said stylus relative to said carrier guide portion.

2. The combination defined in claim 1 wherein said non-planar guide surface has a curvature conforming to that of said arcuate surface of said object.

3. The combination defined in claim 1 further comprising a traversing mechanism of the form having a shaft which may be caused to undergo a linear motion and wherein said means for supporting said other end of said carrier comprises link means pivoted to said carrier and pivoted to said shaft of said traversing mechanism.

4. The combination defined in claim 1 wherein said arcuate surface of said object is a cavity in said object having a spherical surface and wherein said guide portion of said carrier has a matching spherical surface.

5. The combination defined in claim 1 wherein said arcuate surface of said object is a protuberant spherical surface and wherein said guide portion of said carrier is defined by a cavity thereon having a matching spherical interior surface.

6. Means for detecting irregularities in the finish of a curved surface of an object comprising:
    a tubular carrier having a guide portion at one end with a curvature conforming to that of said curved surface of said object and which is juxtaposable thereagainst, said carrier having an opening at said guide portion thereof, a traversing mechanism of the form having an output shaft which may be caused to undergo linear motion, linkage means pivotably coupled to said output shaft of said traversing mechanism and pivotably coupled to a portion of said carrier remote from said guide portion thereof for supporting said carrier while said guide portion contacts said curved surface of said object and for translating said linear movement of said output shaft of said traversing mechanism into a tilting movement of said carrier relative to said object about the center of curvature of said curved surface thereof, a movable stylus disposed in said carrier and having an end extending through said opening of said guide portion thereof to ride against said curved surface of said object as said carrier is tilted by said traversing mechanism, and electrical circuit means for detecting movement of said stylus relative to said guide portion of said carrier as said carrier is tilted.

* * * * *